United States Patent Office 3,294,826
Patented Dec. 27, 1966

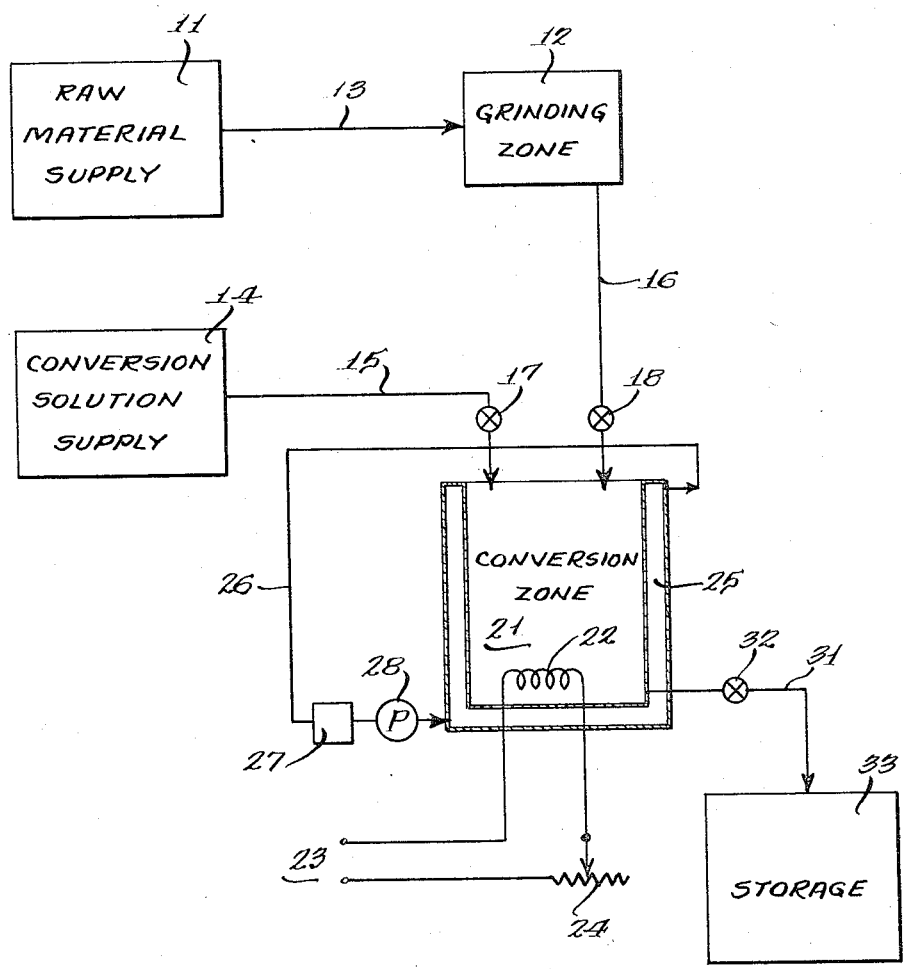

3,294,826
PROCESS FOR ACID HYDROLYSIS OF WASTE ANIMAL MATERIAL AND PRODUCT
James F. O'Neill, 1905 S. 33rd St., Omaha, Nebr. 68111
Filed July 1, 1963, Ser. No. 291,670
8 Claims. (Cl. 260—412.7)

This invention relates to conversion of animal by-products and the like to tallow. More particularly this invention relates to a method of such conversion and to improved products obtained thereby.

Animal by-products from slaughter houses, tanneries and the like, are useful as raw materials for conversion to edible or inedible tallow, e.g., for use in animal feed in admixture with grain, if edible, or for use in manufacture of soap, if inedible. The conversion of such animal by-products to tallow may be accomplished by the by-product producer or may be shipped over considerable distances to conversion plants for such conversion. The accumulation of such animal by-products, of course, presents a sanitation problem. Further, the shipment of by-products or their handling by the producer also involves expense.

It has been proposed to form an emulsion of stabilized product from such by-products by digesting the raw material with phosphoric acid to water solubilize the protein and liberate fat and to thereafter adjust the fat content to a desirable level by readdition of removed fat and then emulsify the remaining fat with the protein solution. Such processing can produce an emulsion having as low as 15 to 30% moisture content, accordingly more concentrated in the desirable components for more economical handling and shipping. The product having a fat level as desired in the emulsion may be dried and ground to produce a solid product.

However, such product contains considerable moisture at the 15 to 30% moisture level and its production involves a plurality of steps which it would be more desirable to avoid. The 15 to 30% moisture content of the product requires subsequent evaporation to obtain a lower moisture content, e.g., during the formation of a dried product or during formation of a lower moisture content product for more economical handling and shipping.

It is a general object of this invention to provide for formation of tallow from raw materials in a new and useful manner whereby an improved product may be obtained.

It is another object of this invention to provide a new and useful method for conversion of animal by-products to edible and/or inedible tallow in good yield.

Yet another object of this invention is to provide an improved method for forming improved tallow products from animal by-products wherein the products have very low moisture content, e.g., less than about 1%.

Still another object of this invention is to provide such a process which is conveniently usable and may be carried out on a continuous basis.

It is a further object of this invention to provide a method in accordance with any of the foregoing objects which involves an initial phase of preparing a conversion reaction mass for continuous processing and a subsequent phase during which the conversion may be carried out on a continuous basis, e.g., by intermittently withdrawing product and adding raw material and conversion solution.

Yet another object of this invention is to provide a new and useful product which can be formed by the method in accordance with the foregoing objects.

Other objects and advantages of the present invention will be apparent from the following descriptions and from the drawings in which the figure is a schematic diagram of a flow scheme usable in a form of the process of the present invention for producing converted tallow products in accordance herewith.

While this invention is susceptible of embodiment in many different forms, there is shown in the figure and will herein be described in detail one specific embodiment of the present method with the understanding that the present disclosure is to be considered as an exemplification of the principles of the invention and is not intended to limit the invention to the illustrated form.

The present invention provides improvement in the conversion of raw materials to tallow by hydrolysis in aqueous acid solution at elevated temperature. In an embodiment of the present invention, the acid solution present during hydrolysis is maintained at a low water content in the presence of effervescing gas. The hydrolyzed tallow product recovered is of low water content. Usually the product is in semi-liquid state and can be stored without refrigeration.

Advantageously, the process may be initiated during an initial hydrolysis phase and thereafter maintained on a continuous operating phase during which hydrolyzed tallow may be continuously, intermittently, withdrawn and additional raw material and acid solution may be added as make-up. For example, animal by-products may be admixed with the conversion or hydrolysis solution, e.g., phosphoric acid solution, and maintained at an elevated temperature, e.g., in the range of about 190–235° F., for a time sufficient to hydrolyze the raw material to tallow. An amount of solution sufficient for such hydrolysis is present in the conversion step. Thereafter, the temperature may be maintained at a lower level, e.g., in the range of about 150–180° F., while the tallow product is continuously withdrawn and additional animal by-product and conversion solution are added. In an advantageous form, the hydrolyzed tallow withdrawn from the reaction zone will have a moisture content less than about 1% without subsequent evaporation of the tallow. Preferably during the hydrolysis reaction an effervescing gas is present. The gas may be, for example, $CO_2$ which may be formed in situ by decomposition of a carbonate salt such as an alkali carbonate.

An aqueous acid solution which can be used in the hydrolysis step in accordance herewith includes a major amount of inorganic acid and minor amounts of water and alkali carbonate or the like, and preferably sodium carbonate. The carbonate reacts with the acid during the reaction to form carbon dioxide in situ and to form a cation for at least partial neutralization of the hydrolyzing acid. The usual acids for hydrolysis of such raw materials may be used; phosphoric acid is particularly preferred because of the resulting advantageous products formed which include phosphoric acid salt such as sodium phosphate as a phosphorus source in the converted product, especially where the converted product is an edible tallow for use in feed compositions and the like.

The raw materials or animal by-products normally convertible to tallow are usable in accordance herewith. Such raw materials include, by way of example, packing house offal, hide trimmings and fleshings, blood, bones, meat scraps, and other materials including poultry offal, heads, legs, viscera, blood and the like, fish by-products, etc. Advantageously, the animal by-products may be mechanically broken or ground to small particle size prior to digestion in the hydrolysis solution.

Referring now to the figure of the drawing, in further illustration of a form of the present process, there is provided a supply zone 11 which may be a tank or other container from which raw material may be supplied for conversion to tallow. In the illustrated form, supply zone 11 is a supply of packing house offal or by-product materials including a mixture of hide trimmings and fleshings, blood, bones, meat scraps and attendant materials. The supply of raw material is subjected to mechanical breaking or grinding in a grinding zone illustrated by reference numeral 12, the arrowed line 13 indicating charging of the material to the grinding zone. A conversion solution is maintained in zone 14; to initiate the hydrolysis of the raw material, conversion solution is charged through line 15 and ground offals are charged through line 16 via valves 17 and 18 respectively to conversion or reaction zone 21. Valves 17 and 18 may be used to regulate the flow of materials to conversion zone 21 as desired. A screw conveyor, e.g., metered screw conveyor, may be used to convey solid or semi-solid raw materials from zone 12 to zone 21. The figure is for illustration of flow only and is not to be taken as an illustration of preferred apparatus.

The ratio of conversion solution charged to zone 21 may, for example, be from 1 to 20 parts by weight per 100 parts by weight raw material, although it is preferred during the initial phase of the conversion operation that at least about 1 part by weight of conversion solution be present in zone 21 per 10 parts by weight raw material. Of course, these ratios will depend somewhat on the amount of convertible materials in the raw materials for conversion to tallow.

Heating means in the form of an electrical heating coil 22, operable by an electric power source indicated as 23 through a rheostat 24 which may serve as a temperature control for coil 22, is present in the conversion zone for heating the conversion zone. Alternatively, or as a supplement to the heating, a jacket 25 may be provided on reactor 21 with a suitable recycle line 26, heater 27 and pump 28 for circulating heat exchange fluid through the jacket for maintaining proper temperature. During the initial phase of the reaction the reaction mass in the conversion zone is preferably maintained in the temperature in the range of about 190–235° F. This initial phase is maintained for a time sufficient to hydrolyze the animal by-product to tallow. Tallow may then be withdrawn, e.g., through line 31 controlled by valve 32, to storage, illustrated in the form of a tank 33. It may be advantageous to provide a screen across the inlet of line 31 within reaction zone 21 to prevent solids of an undesirable size from being removed through line 31.

Upon withdrawal of a portion of the reaction mass through line 31, make-up conversion solution and raw material are charged to zone 21, preferably in metered amounts. The process may now be maintained at a lower temperature, e.g., at about 150–180° F. for an extended period of time while continuing intermittent withdrawal of product through line 21 and charging make-up reaction mass, e.g., via lines 15 and 16. Preferably, the conversion solution is added as make-up in an amount sufficient to hydrolyze animal by-product added or in very slight excess of such amount. The product withdrawn through line 31 may be monitored if desired for converted tallow and rate of withdrawal of tallow product may be accordingly adjusted to the state of conversion desired in the product tallow at the conversion temperature used.

The conversion solution may be a solution comprising a major amount of phosphoric acid and minor amounts of water and sodium carbonate. For example, an aqueous solution of about 60 to 70 percent phosphoric acid and about 5 percent sodium carbonate is fully sufficient. The product would accordingly contain significant amounts of sodium phosphate. Of course, greater or lesser amounts of sodium phosphate may be present depending on the amount of sodium carbonate used.

In the process, the effervescing gas, e.g., $CO_2$ formed in situ, being released from the reaction system apparently assists in carrying greater amounts of water vapor overhead through evaporation to give a lower moisture content in the product. The source of effervescing gas may be included in solution with the hydrolysis or conversion acid. Where the gas is formed in situ, sodium carbonate is a preferred source in view of its beneficial solubility in the reaction system. For example, sodium carbonate may be included in an amount sufficient to form a sufficient amount of carbon dioxide by reaction with the phosphoric acid to carry a sufficient amount of water vapor from the reaction mass to provide a moisture content of less than about 1% in the withdrawn hydrolyzed tallow.

Although the flow scheme of the figure was described using flow lines such as line 13, valved lines 15, 16 and 31 for clarity in illustration of the present method, it is to be, of course, understood that the animal by-product raw material and the conversion solution may more advantageously be manually added to the reaction zone during the process, e.g., from vats and the like. For example, the raw material may be carried to a grinding device and ground and thence conveyed and dropped into a conversion reactor in the amount desired and the hydrolysis solution may then be poured in from drums or the like. The converted product may be withdrawn from the reactor by scoops or the like, as well as by the valved drain line 31 illustrated in the figure. The product discharge line may be used to direct the product directly to storage drums or the like. Other usable means for heating the reaction zone will be evident.

As a more particular example of the conversion of raw materials in accordance herewith, a mass of packing house offals was ground to small particle size and placed in a tank containing a solution formula of 6 percent water, 5 percent sodium carbonate and 89 percent of a 75 percent aqueous phosphoric acid. The material in the tank was heated by an electrical immersion coil to a temperature of 215° F. and maintained at that temperature for two hours. Thereafter the temperature was reduced to 150° F. and from that time on the process was continuous. Material was withdrawn as converted tallow and additional solution formula and packing house offal were added as make-up intermittently throughout the continued operation as the treating solution was consumed. The recovered product was tallow, classified as edible or inedible depending upon the type of raw material used.

The product tallow under storage conditions remained in semi-liquid state over an extended period of time and was of sufficiently low moisture content to enable its storage in metal drums without refrigeration. The yield of tallow was 62 percent tallow in the product and the moisture content of the product was less than 1 percent.

The low moisture content of the product permits more economical handling and shipping and also permits more advantageous drying of the product to produce a dry tallow. Accordingly, the low moisture content product may be conveniently dried, e.g., in a hot air drier, and thereafter ground for use in animal feeds. The presence of a minor amount of sodium phosphate or other phosphate in the product supplements the phosphorus in the feed.

I claim:

1. Tallow from hydrolysis of animal by-products containing a small amount of sodium phosphate formed in situ during hydrolysis with phosphoric acid and less than about 1% moisture without evaporation subsequent to hydrolysis, said tallow being capable of storage without refrigeration.

2. Semi-liquid tallow having alkali phosphate formed in situ during hydrolysis and a moisture content less than about 1% formed by hydrolysis without evaporation subsequent to hydrolysis.

3. A method for forming tallow from animal by-products which comprises grinding said animal by-products to a small particle size, heating the resulting ground animal by-product in admixture with an aqueous solution containing a major amount of phophoric acid and a minor amount of alkali carbonate at a temperature in the range of about 190° F. to 235° F. until the animal by-product hydrolyzes to tallow, and thereafter maintaining the temperature of the conversion mass in the range of about 150° F. to 180° F. while continuously withdrawing hydrolyzed tallow having a moisture content less than about 1% from the conversion mass, adding additional ground animal by-product for hydrolysis thereof to the conversion mass as make-up and adding additional amounts of said hydrolyzing solution sufficient to hydrolyze said additional added animal by-product, said minor amount of alkali carbonate being sufficient to enhance evaporation of water from the reaction mixture and reduce moisture content in the hydrolyzed tallow to said less than about 1%.

4. A method for forming tallow from animal by-products which comprises heating the animal by-product in admixture with a hydrolyzing aqueous solution of about 60% to 70% phosphoric acid and a minor amount of sodium carbonate at a temperature in the range of about 190° F. to 235° F. until desired hydrolysis to tallow is effected and thereafter maintaining the temperature of hydrolysis in the range of about 150° F. to 180° F. while withdrawing hydrolyzed tallow from the reaction mixture and while adding additional said animal by-product for hydrolysis thereof to the reaction mass as make-up and adding additional amounts of said solution, said minor amount of sodium carbonate being sufficient to form carbon dioxide by reaction with phosphoric acid in an amount sufficient to enhance evaporation of water from the reaction mixture and reduce moisture content in the withdrawn hydrolyzed tallow to less than about 1% moisture content.

5. The method of claim 4 wherein said minor amount of sodium carbonate is about 5%.

6. A method for forming tallow from animal by-products which comprises hydrolyzing the animal by-product in the presence of a solution of a major amount of phosphoric acid and a minor amount of water in the presence of effervescing carbon dioxide gas at an elevated hydrolysis temperature until the animal by-product hydrolyzes to tallow and thereafter maintaining the temperature of hydrolysis at a lower temperature of at least about 150° F. in the presence of effervescing gas while continuously withdrawing hydrolyzed tallow from the reaction mixture, adding additional said animal by-product to the reaction mass as make-up and adding additional amounts of said solution sufficient to hydrolyze said additional added animal by-product, said effervescing gas being in an amount sufficient to enhance evaporation of water from said reaction mass to a moisture content less than about 1%.

7. A method for forming tallow from animal by-products which comprises heating the animal by-product in admixture with about .1 part by weight of an aqueous solution of about 60% to 70% phosphoric acid and about 5% alkali carbonate at a temperature of about 215° F. for about 2 hours and thereafter maintaining the temperature of hydrolysis at about 150° F. while continuously withdrawing hydrolyzed tallow from the reaction mixture, adding additional said animal by-product for hydrolysis thereof to the reaction mass as make-up and adding about .05 part of said solution per part of added animal by-product.

8. A method for forming tallow from animal by-products which comprises treating the animal by-products with at least 1 to 20 weight percent of a solution of a major amount of concentrated phosphoric acid and a small amount of sodium carbonate at an elevated hydrolysis temperature sufficient to hydrolyze the animal by-product to tallow until conversion of animal by-product to tallow is effected and thereafter maintaining the temperature of hydrolysis at a lower temperature sufficient to continue hydrolysis of added animal by-product by added hydrolyzing solution while withdrawing portion of the hydrolyzed tallow from the reaction mixture and adding to said reaction mass additional animal by-product as make-up and additional amounts of said solution in slight excess of the amount sufficient to hydrolyze said additional added animal by-product, said small amount of sodium carbonate being sufficient to form in situ an amount of carbon dioxide gas for carrying water vapor from the hydrolysis mass and reducing the moisture content in withdrawn tallow to less than about 1% and storing the resulting withdrawn semi-liquid state tallow product without refrigeration.

References Cited by the Examiner
UNITED STATES PATENTS
1,124,852   1/1915   Burkle _____ 260—412.7

FOREIGN PATENTS
2,330   1799   Great Britain.
98   1874   Great Britain.

CHARLES B. PARKER, *Primary Examiner.*

A. H. SUTTO, *Assistant Examiner.*